United States Patent
Seo et al.

(10) Patent No.: US 8,031,315 B2
(45) Date of Patent: Oct. 4, 2011

(54) MOBILE COMMUNICATION DEVICE HAVING A LIQUID CRYSTAL PANEL AND A FLEXIBLE PRINTED CIRCUIT BOARD FIXED TO A BACKLIGHT ASSEMBLY

(75) Inventors: Young-Hyoung Seo, Chungcheongbuk-Do (KR); Kook-Chan Ahn, Chungcheongbuk-Do (KR); Hye-Jeong Yoon, legal representative, Cheongju-si (KR)

(73) Assignee: LG Display Co., Ltd., Seoul (KR)

( * ) Notice: Subject to any disclaimer, the term of this patent is extended or adjusted under 35 U.S.C. 154(b) by 293 days.

(21) Appl. No.: 12/213,061

(22) Filed: Jun. 13, 2008

(65) Prior Publication Data
US 2008/0309844 A1    Dec. 18, 2008

(30) Foreign Application Priority Data
Jun. 15, 2007    (KR) .................. 10-2007-0059053

(51) Int. Cl.
G02F 1/1345    (2006.01)
G06F 1/16    (2006.01)
(52) U.S. Cl. .................... 349/150; 361/679.3
(58) Field of Classification Search ............ 349/58, 349/150; 361/679.3
See application file for complete search history.

(56) References Cited

U.S. PATENT DOCUMENTS

| 2003/0058230 | A1* | 3/2003 | Ide ............................. 345/204 |
| 2003/0157861 | A1* | 8/2003 | Furukawa .................. 445/24 |
| 2006/0139501 | A1* | 6/2006 | Lee et al. ................... 349/21 |
| 2006/0221269 | A1* | 10/2006 | Kawaguchi ................ 349/58 |
| 2006/0290871 | A1* | 12/2006 | Harada ...................... 349/153 |
| 2007/0013824 | A1* | 1/2007 | Yu et al. .................... 349/58 |
| 2007/0146570 | A1* | 6/2007 | Yu et al. .................... 349/58 |

FOREIGN PATENT DOCUMENTS

EP    1746616 A1 *    1/2007

* cited by examiner

*Primary Examiner* — David Nelms
*Assistant Examiner* — Paul C Lee
(74) *Attorney, Agent, or Firm* — Morgan, Lewis & Bockius LLP

(57) ABSTRACT

A mobile communication device comprises: a liquid crystal (LC) panel; a drive integrated circuit connected to the LC panel; a keypad printed circuit board (PCB) having a keypad connected to the drive integrated circuit; a flexible printed circuit board (FPCB) for connecting the drive integrated circuit and the keypad PCB to each other; a backlight assembly having an outer case, for supplying light to the LC panel; and a fixing member for fixing the FPCB and one end of the outer case of the backlight assembly by adhering to each other. The mobile communication device prevents a part of light emitted from an optical source from being displayed on a screen with a high brightness.

9 Claims, 3 Drawing Sheets

MOBILE COMMUNICATION DEVICE HAVING A LIQUID CRYSTAL PANEL AND A FLEXIBLE PRINTED CIRCUIT BOARD FIXED TO A BACKLIGHT ASSEMBLY

BACKGROUND OF THE INVENTION

1. Field of the Invention

The present invention relates to a mobile communication device, and more particularly, to a mobile communication device capable of preventing a part of light emitted from an optical source from being displayed on a screen with a high brightness.

2. Description of the Background Art

Generally, a mobile communication device such as a portable computer, a portable phone, or a PDA is provided with a display portion for displaying a screen, as well as a body portion. As the display portion, a liquid crystal display (LCD) module having advantages such as a small size, a light weight, and low consumption power is being widely used.

The LCD module displays a desired image on a screen by controlling an optical transmittance according to image signals applied to a plurality of switching devices for control arranged in a matrix form.

Hereinafter, the conventional mobile communication device will be explained in more detail with reference to the attached drawings.

As shown in FIG. 1, the mobile communication device comprises a body portion 10b, and a display portion 10a for displaying information from the body portion 10a.

As shown in FIGS. 2 and 3, the mobile communication device comprises an LC (liquid crystal) panel 1; a drive integrated circuit 2 mounted in the LC panel 1; a keypad PCB (Printed Circuit Board) 3 having a keypad 3a connected to the drive integrated circuit 2; an FPCB (Flexible Printed Circuit Board) 4 for connecting the drive integrated circuit 2 and the keypad PCB 3 to each other; and a backlight assembly 5 for supplying light to the LC panel 1. The mobile communication device also comprises an upper case 8 and a lower case 9 that receive therein the LC panel 1, the backlight assembly 5, the keypad PCB 3, etc., and protect them. A conductive tape 7 for discharging static electricity charged at the LC panel 1 is further provided.

In a process for manufacturing the mobile communication device, the upper case 8 applies a pressure to the FPCB 4 when the upper case 8 and the lower case 9 that surround the LC panel 1 and the keypad PCB 3 are coupled to each other. Accordingly, the FPCB 4 moves, and thus the LC panel 1 directly connected to the FPCB 4 also moves.

As a result, the LC panel 1 and the backlight assembly 5 are mis-aligned to each other. Accordingly, when the mobile communication device is operated, a part of light emitted from the backlight assembly 5 is displayed on a screen of the LC panel 1 with a high brightness. That is, the light is observed as a spot on the screen.

While the mobile communication device having been completely manufactured is used by a user, when the user presses the keypad 3a, the keypad PCB 3 applies a pressure to the FPCB 4. Accordingly, the FPCB 4 moves, and thus the LC panel 1 directly connected to the FPCB 4 also moves.

As a result, the LC panel 1 and the backlight assembly 5 are mis-aligned to each other. Accordingly, when the mobile communication device is operated, a part of light emitted from the backlight assembly 5 is observed as a spot on a screen of the LC panel 1. As the mobile communication terminal is used for a longer time, the spot is displayed with a higher brightness and with a wider range, In the conventional mobile communication device, so as to remove static electricity generated from the LC panel 1, the conductive tape 7 partially attached to the FPCB 4 has a structure to cover an upper part of the drive integrated circuit 2 of the FPCB 4. Accordingly, the mobile communication device has a thicker thickness, and thus components disposed in the upper case 8 and the lower case 9 have a thickness thicker than that of the upper case 8 and the lower case 9 in a vertical direction. As a result, the upper case 8 applies a pressure to the conductive tape 7, and thus the LC panel 1 moves.

Therefore, a part of light emitted from the backlight assembly 5 is observed on a screen of the LC panel 1 as a spot.

SUMMARY OF THE INVENTION

Therefore, it is an object of the present invention to provide a mobile communication device capable of preventing a part of light emitted from an optical source from being observed as a spot due to a high brightness on a screen.

To achieve these and other advantages and in accordance with the purpose of the present invention, as embodied and broadly described herein, there is provided a mobile communication device, comprising: a liquid crystal (LC) panel; a drive integrated circuit connected to the LC panel; a keypad printed circuit board (PCB) having a keypad connected to the drive integrated circuit; a flexible printed circuit board (FPCB) for connecting the drive integrated circuit and the keypad PCB to each other; a backlight assembly having an outer case, for supplying light to the LC panel; and a fixing member for fixing the FPCB and one end of the outer case of the backlight assembly by adhering to each other.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Reference will now be made in detail to the preferred embodiments of the present invention, examples of which are illustrated in the accompanying drawings.

A mobile communication device according to the present invention comprises: a liquid crystal (LC) panel; a drive integrated circuit connected to the LC panel; a keypad PCB having a keypad connected to the drive integrated circuit; an FPCB for connecting the drive integrated circuit and the keypad PCB to each other; a backlight assembly for supplying light to the LC panel; and a fixing member for fixing the FPCB and one end of the outer case of the backlight assembly by adhering to each other.

Figure 4:
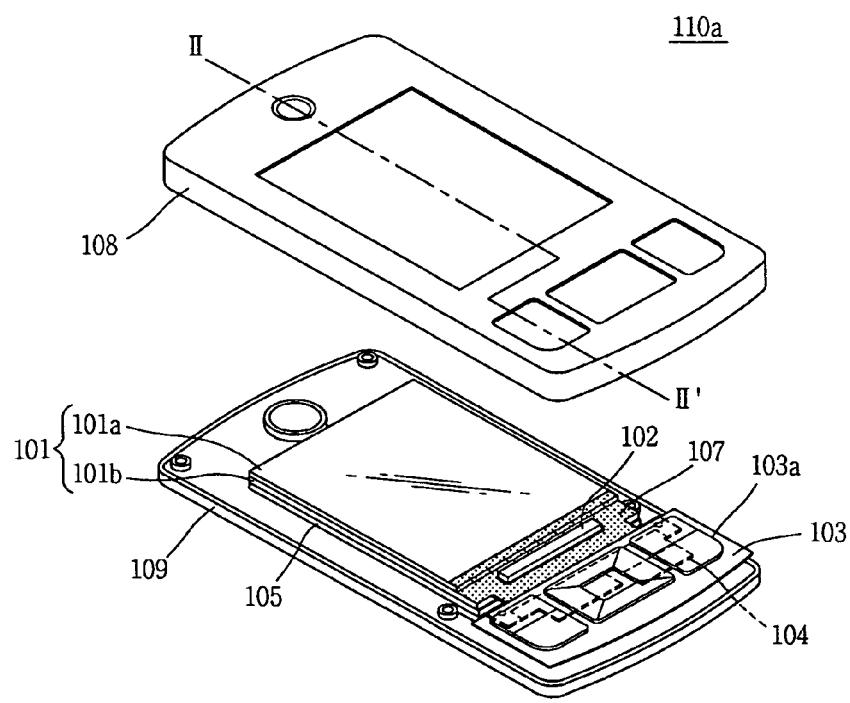
FIG. 4 is a disassembled perspective view of a mobile communication device according to a preferred embodiment of the present invention.
Figure 5:
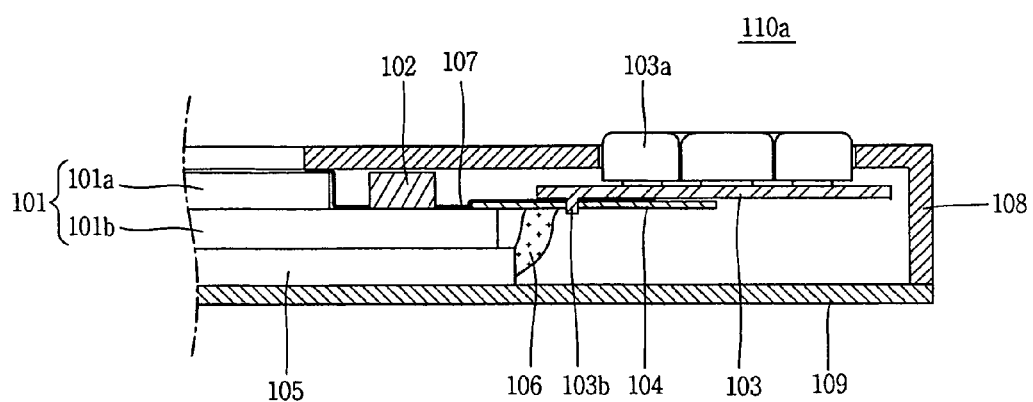
FIG. 5 is a sectional view taken along line 'II-II' of FIG. 4.

Hereinafter, the mobile communication device according to the present invention will be explained in more detail with reference to the attached drawings. Referring to FIGS. 4 and 5, the mobile communication device according to the present invention comprises: a liquid crystal (LC) panel 101; a drive integrated circuit 102 connected to the LC panel 101; a keypad PCB 103 having a keypad 103a connected to the drive integrated circuit 102; an FPCB 104 for connecting the drive integrated circuit 102 and the keypad PCB 103 to each other; a backlight assembly 105 having an outer case, for supplying light to the LC panel 101; and a fixing member 106 for fixing the FPCB 104 and one end of the outer case of the backlight assembly by adhering to each other. One or more protrusions 103b are formed on a rear surface of the keypad PCB 103. And, a first groove 104a for coupling the protrusion 103b of the keypad PCB 103 is formed at the FPCB 104.

The LC panel 101 of the mobile communication device is composed of a first substrate 101a and a second substrate 101b. A conductive tape 107 is attached to one end of the first substrate, the second substrate that is not overlapping the first substrate, and a region of the FPCB. Here, each region of the conductive tape that is attached to first substrate, second substrate and FPCB are connected. And, the conductive tape 107 is provided with a second groove 107a having a size equal to or larger than that of the drive integrated circuit 102. And, a third groove 107b is formed at a position corresponding to the protrusion 103b of the keypad PCB 103. There are provided an upper case 108 and a lower case 109 that receive therein the LC panel 101, the backlight assembly 105, etc. and protect them.

Figure 1:
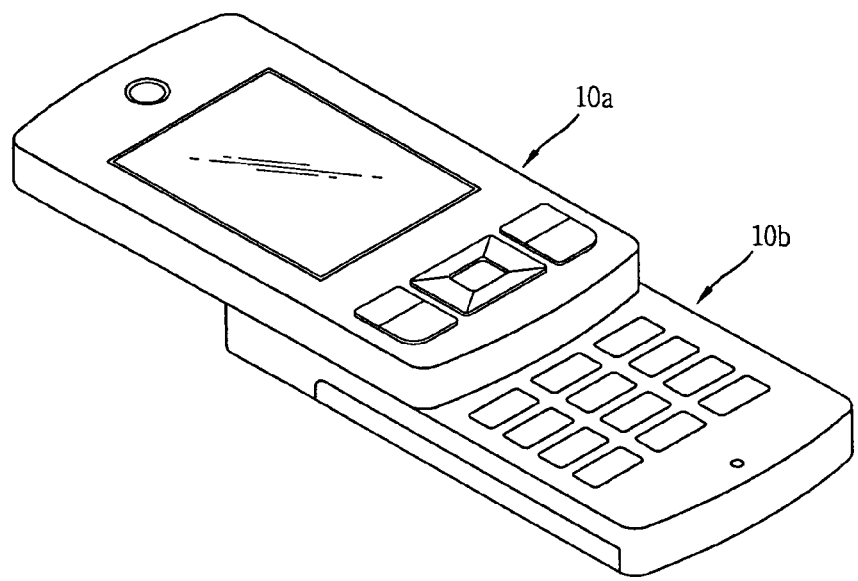
FIG. 1 is an assembled perspective view of a mobile communication device in accordance with the conventional art.
Figure 2:
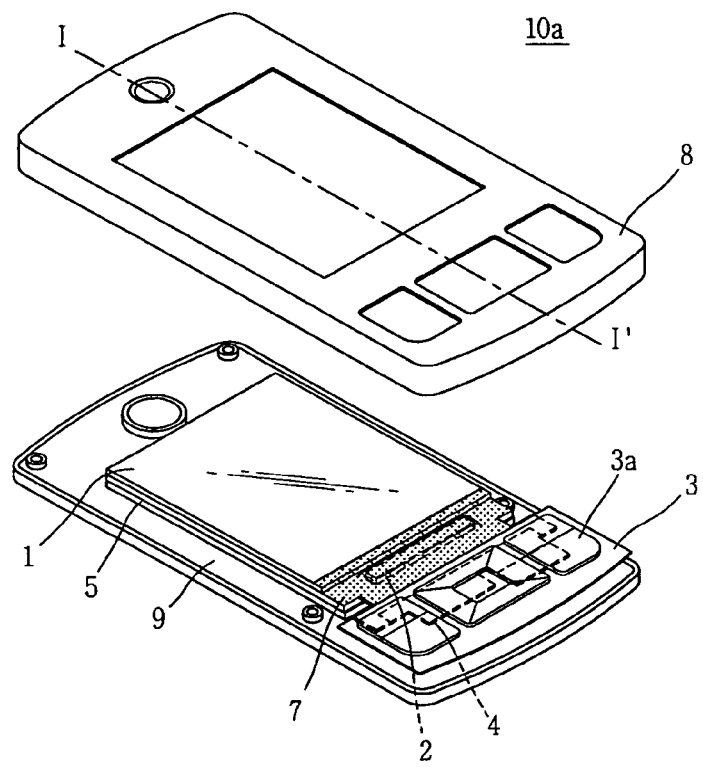
FIG. 2 is a disassembled perspective view of a part of the mobile communication device of FIG. 1.
Figure 3:
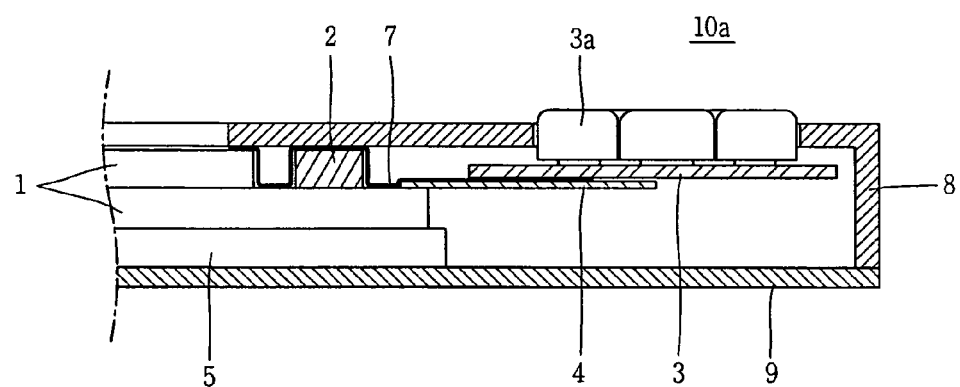
FIG. 3 is a sectional view taken along line 'I-I' of FIG. 2.

The mobile communication device may be largely divided into a display portion 110a, and a body portion (not shown). The display portion 110a includes the LC panel 101, the backlight assembly 105, etc., and the body portion (not shown) includes a numeric keypad, etc. The body portion of the mobile communication device will be explained with reference to FIG. 1 which shows the conventional mobile communication device.

Each component of the mobile communication device according to the present invention will be explained in more detail.

As shown in FIG. 4, the LC panel 101 is composed of a first substrate 101, a color filter substrate; and a second substrate 101b, a thin film transistor (TFT) array substrate. An LC layer (not shown) is interposed between the first substrate 101a and the second substrate 101b.

A color filter layer for representing colors, and a black matrix are formed on the first substrate 101a. And, gate lines and data lines arranged in horizontal and vertical directions and defining a plurality of pixels are formed on the second substrate 101b. At each of the pixels, formed are a plurality of pixel electrodes, and a plurality of TFTs for transmitting signals of the data lines to the respective pixel electrodes by being switched by signals of the gate lines. A common electrode for driving LC molecules together with the pixel electrodes is formed on the first substrate 101a or the second substrate 101b. The mobile communication device displays an image as LC molecules are driven by an electric field formed between the pixel electrodes and the common electrode.

The drive integrated circuit 102 for driving the LC panel 101 is mounted on the end of an upper surface of the second substrate 101b of the LC panel 101. However, the position of the drive integrated circuit 102 is not limited onto the second substrate 101b of the LC panel 101. Rather, the drive integrated circuit 102 may be disposed outside the LC panel 101, and may be connected to the LC panel 101 through connection means.

The drive integrated circuit 102 is connected to the keypad 103a through connection means such as the FPCB 104. And, the keypad 103a is disposed on the keypad PCB 103.

Menu selection buttons (e.g., call button) for selecting functions of the mobile communication device are provided on the keypad 103, through which a user can select menus with watching a screen of the LC panel 101.

Referring to FIGS. 4 and 5, the backlight assembly 105 for supplying light to the LC panel 101 is disposed below the LC panel 101. Although not shown, the backlight assembly 105 includes an outer case, an optical source, a light guide plate, a reflection sheet, an optical sheet, etc.

The outer case serves to receive therein components of the backlight assembly 5, that is, an optical source, a light guide plate, a reflection sheet, an optical sheet, etc., and to fix and protect them. The outer case may be provided one or more in number. The optical source may be a light emitting diode and a fluorescent lamp. A small display device such as the mobile communication device of the present invention has a tendency to adopt a light emitting diode, whereas a large display device (not shown) has a tendency to a fluorescent lamp. The light guide plate serves to guide light emitted from an optical source to the LC panel 101. And, the reflection sheet serves to reflect light leaked to a lower side of the light guide plate into the light guide plate. The optical sheet is provided with a diffusion sheet, a prism sheet, a protection sheet, etc., and supplies light emitted from the light guide plate to the LC panel 101 after a converting process.

Referring to FIG. 5, the backlight assembly 105 is adhered to the FPCB 104 by the fixing member 106 thus to be fixed.

Between on a rear surface of the FPCB 104 and on the outer case of the backlight assembly 105, the fixing member 106 is formed on a region closer thereto. That is, the fixing member 106 is formed to be integrally connected to a region on a rear surface of the FPCB 104, and to a region on a side surface, or a rear surface extending from the side surface of the outer case of the backlight assembly 105. Accordingly, the fixing member 106 fixes the FPCB 104 and the backlight assembly 105.

The FPCB 104 is directly connected to the LC panel 101. Therefore, the fixing member 106 not only fixes the FPCB 104 and the outer case of the backlight assembly 105 by adhering to each other, but also tightly fixes the LC panel 101 connected to the FPCB 104 to the outer case of the backlight assembly 105.

The fixing member 106 is formed by hardening ultraviolet rays hardened material. More concretely, the ultraviolet rays hardened material is formed by depositing hardened material from one end of the outer case of the backlight assembly 105 to one part of the FPCB 104 the most adjacent to the outer case of the backlight assembly 105, and then exposing the hardened material to ultraviolet rays for hardening.

In the present invention, the fixing member 106 is formed of ultraviolet ryas hardened material. However, the fixing member 106 is not limited thereto, but may be formed of any material for effectively connecting the FPCB 104 and the backlight assembly 105 to each other.

Figure 6:
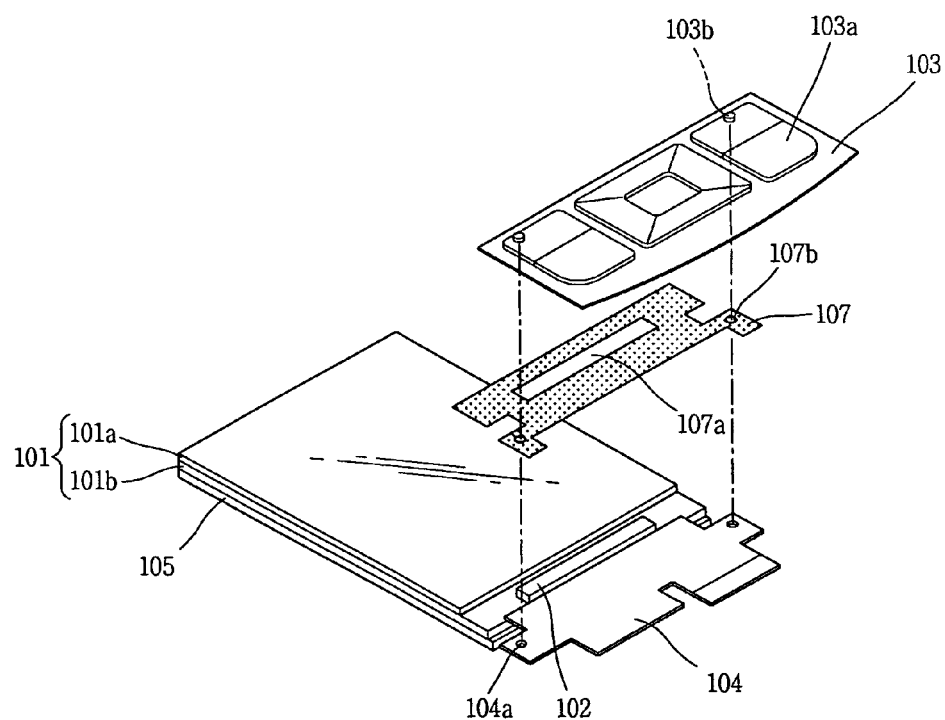
FIG. 6 is a disassembled perspective view of a part of the mobile communication device of FIG. 4, which shows a keypad PCB, a conductive tape, and an FPCB.

As shown in FIG. 6, one or more protrusions 103b protruding in a direction of the FPCB 104 are formed on a rear surface of the keypad PCB 103. And, a first groove 104a is formed on the FPCB 104 in correspondence to the protrusion 103b of the keypad PCB 103. The first groove 104a is coupled to the protrusion 103b.

As the protrusion 103b of the keypad PCB 103 is coupled to the first groove 104a of the FPCB 104, the keypad PCB 103 and the FPCB 104 are tightly fixed.

As shown in FIGS. 4 and 5, the conductive tape 107 is attached to a part of the end of an upper surface of the first substrate 101a, a part of the end of an upper surface of the second substrate 101b, and a part of the FPCB 104. The conductive tape 107 discharges static electricity charged at the LC panel 101 through a ground pattern of the FPCB 104. Here, the conductive tape 107 may overlap some regions of the keypad PCB 103.

The conductive tape 107 is provided with a second groove 107a having a size equal to or larger than that of the drive integrated circuit 102. The second groove 107a is coupled to the drive integrated circuit 102.

Once the second groove 107a of the conductive tape 107 and the drive integrated circuit 102 are coupled to each other, the conductive tape 107 is not disposed on an upper surface of the drive integrated circuit 102, but is disposed only at the periphery of the drive integrated circuit 102.

A third groove 107b coupled to the protrusion 103b of the keypad PCB 103 is formed on the conductive tape 107. More concretely, as shown in FIG. 6, in the case that the protrusion 103b of the keypad PCB 103 overlaps some regions of the conductive tape 107, the third groove 107b is formed at the conductive tape 107 in correspondence to the protrusion 103b of the keypad PCB 103. The third groove 107b is coupled to the protrusion 103b of the keypad PCB 103 together with the first groove 104a of the FPCB 104.

As aforementioned, in the mobile communication device according to the present invention, between on the FPCB 104 and on the outer case of the backlight assembly 105, the fixing member 106 is formed on a region closer thereto. Therefore, the fixing member 106 not only fixes the FPCB 104 and the outer case of the backlight assembly 105 by adhering to each other, but also tightly fixes the LC panel 101 connected to the FPCB 104 to the backlight assembly 105.

Accordingly, even when a pressure is applied to the FPCB 104 while the mobile communication device is being manufactured or used, the FPCB 104 and the LC panel 101 do not move. As a result, a spot does not occur on a screen when the mobile communication device is operated.

In the mobile communication device of the present invention, one or more protrusions 103b are formed on a rear surface of the keypad PCB 103. And, the first groove 104a is formed at the FPCB 104 in correspondence to the protrusion 103b. As the first groove 104a and the protrusion 103b are coupled to each other, the keypad PCB 103 and the FPCB 104 are tightly fixed.

Accordingly, even when a pressure is applied to the keypad PCB 103 as a user presses the keypad 103a, the FPCB 104 does not move. Accordingly, the LC panel 101 does not move, either. As a result, a spot does not occur on a screen when the mobile communication device is operated.

In the mobile communication device of the present invention, the second groove 107a having a size equal to or larger than that of the drive integrated circuit 102 is formed at the conductive tape 107, and is coupled to the drive integrated circuit 102. Accordingly, the conductive tape 107 is not disposed on an upper surface of the drive integrated circuit 102, but is disposed only at the periphery of the drive integrated circuit 102.

While the mobile communication device is being manufactured, a pressure is not applied to the conductive tape 107 from the upper case 108. Accordingly, the LC panel 101 does not move, and thus a spot does not occur on a screen when the mobile communication device is operated.

In the drawings and the description of the present invention, a portable terminal was explained as an example of the mobile communication device. However, the mobile communication device is not limited to the portable terminal, but may be applied to various devices such as a portable computer and a PDA.

As aforementioned, in the mobile communication device of the present invention, between on the FPCB and on the outer case of the backlight assembly, the fixing member is formed on a region closer thereto. One or more protrusions are formed on a rear surface of the keypad PCB, and the first groove coupled to the protrusion is formed at the FPCB. Also, the second groove having a size equal to or larger than that of the drive integrated circuit is formed at the conductive tape, and is coupled to the drive integrated circuit. Accordingly, the LC panel and the backlight assembly can be aligned to each other, and display quality on the screen of the mobile communication device can be enhanced.

The foregoing embodiments and advantages are merely exemplary and are not to be construed as limiting the present invention. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile communication device, comprising:
   a liquid crystal (LC) panel;
   a drive integrated circuit connected to the LC panel;
   a keypad printed circuit board (PCB) having a keypad connected to the drive integrated circuit;
   a flexible printed circuit board (FPCB) for connecting the drive integrated circuit and the keypad PCB to each other;
   a backlight assembly for supplying light to the LC panel;
   a fixing member for fixing the FPCB and the backlight assembly by adhering to each other; and
   a case for encasing the FPCB and the backlight assembly, wherein the FPCB and the backlight assembly are adhered to each other within the case,
   wherein one end portion of the fixing member is adhered at the backlight assembly and other end portion of the fixing member is adhered at the area between the liquid crystal panel and the keypad printed circuit board so that the area of between the liquid crystal panel and the FPCB is fixed to the case.

2. The mobile communication device of claim 1, wherein the fixing member is a ultraviolet rays hardened material.

3. The mobile communication device of claim 1, wherein the LC panel comprises a first substrate and a second substrate, and the drive integrated circuit is mounted at the end of an upper surface of the second substrate.

4. The mobile communication device of claim 1, wherein one or more protrusions are formed on a rear surface of the keypad PCB, and a first groove coupled to the protrusion of the keypad PCB is formed on the FPCB.

5. The mobile communication device of claim 4, wherein the LC panel comprises a first substrate and a second substrate to be attached to each other, a portion of the second substrate is extended from one end of the first substrate to expose a portion of the second substrate, and a conductive tape is attached to one end of the first substrate, the exposed portion of the second substrate, and a region of the FPCB,
    wherein, each region of the conductive tape attached to first substrate, second substrate and FPCB is connected.

6. The mobile communication device of claim 5, wherein a third groove is formed at the conductive tape in correspondence to the protrusion of the keypad PCB.

7. The mobile communication device of claim 5, wherein a second groove having a size equal to or larger than that of the drive integrated circuit is formed at the conductive tape, and is coupled to the drive integrated circuit.

8. The mobile communication device of claim 7, wherein a third groove is formed at the conductive tape in correspondence to the protrusion of the keypad PCB.

9. The mobile communication device of claim 1, wherein the case includes an upper case and a lower case to be assemble to each other to encase the FPCB and the backlight assembly.

* * * * *